United States Patent [19]

Dennis

[11] 3,907,400

[45] Sept. 23, 1975

[54] CONTACT POST

[75] Inventor: Richard K. Dennis, Etters, Pa.

[73] Assignee: E. I. Du Pont de Nemours and Company, Wilmington, Del.

[22] Filed: Nov. 21, 1973

[21] Appl. No.: 417,928

[52] U.S. Cl.......... 339/221 R; 174/94 R; 339/276 A

[51] Int. Cl.²........................................... H01R 9/16

[58] Field of Search......... 339/214 R, 214 S, 198 R, 339/252 R, 217 R, 217 S, 221 R, 17 R, 276 A; 174/94 R

[56] References Cited

UNITED STATES PATENTS

| | | | |
|---|---|---|---|
| 3,288,915 | 11/1966 | Hatfield et al. | 174/94 R |
| 3,444,617 | 5/1969 | Stricker et al. | 339/47 R |
| 3,601,750 | 8/1971 | Mancini | 339/221 R X |
| 3,774,142 | 11/1973 | Siegler | 339/14 R |

OTHER PUBLICATIONS

Malco Bulletin No. 550, 1958, pages 2 and 3.

*Primary Examiner*—Joseph H. McGlynn
*Assistant Examiner*—James W. Davie
*Attorney, Agent, or Firm*—Thomas Hooker

[57] ABSTRACT

A contact post with a pair of arcuate springs extending from opposite sides of the post for retaining the post in a hole formed through the thickness of a support. The springs include weld tabs for securing wires to the post.

12 Claims, 8 Drawing Figures

CONTACT POST

The invention relates to a contact post intended to be mounted in a hole in a supporting member for forming electrical connections between a number of circuit elements. Wire-receiving tabs are provided to either side of the portion confined in the support. A post extends from one or both sides of the central portion for forming an electrical connection with circuitry remote from the support.

The portion in the support includes a pair of arcuate springs, each extending from one side of the post and approximately 180° around the post so that the pair of springs form a resilient, generally cylindrical body which is press-fitted within the hole in the support. Tabs extend from each side of the springs toward the post to form the annular recesses supporting the post. Tooling openings are provided in the middle of the springs to permit clamping tooling to hold the portion of the post surrounded by the springs during bending of the springs and thereby assure that the post is axially aligned relative to the generally cylindrical spring portion. This assures that when the contact post is mounted in the hole in the support, the projecting post extends along the axis of the hole and is properly located for forming electrical connections with the remote circuits.

Circuit contact wires or posts are well known. U.S. Pat. No. 2,994,057 discloses a pin having rigid tapered radial fins which are forced into the sides of a circuit board hole to support the pin on the board. In U.S. Pat. No. 3,601,750, the pin is mounted to the board by means of a surrounding ferrule which is deformed to secure the pin to the board. U.S. Pat. No. 3,444,617 teaches a circuit board pin having a pair of swaged curved sections which, when inserted into a circuit board hole, support the pin by engagement with a small section of the interior circumference of the circuit board hole.

Accordingly, the purpose of this invention is to provide an improved contact post of the type having a resilient portion for mounting in a hole in a support member, fine wire tie-offs at either end of the mounting portion and a contact post extending from the mounting portion in axial alignment with the mounting portion.

Other objects and features of the invention will become apparent as the description proceeds, especially when taken in conjunction with the accompanying drawings illustrating the invention, of which there is one sheet.

IN THE DRAWINGS

Figure 1:
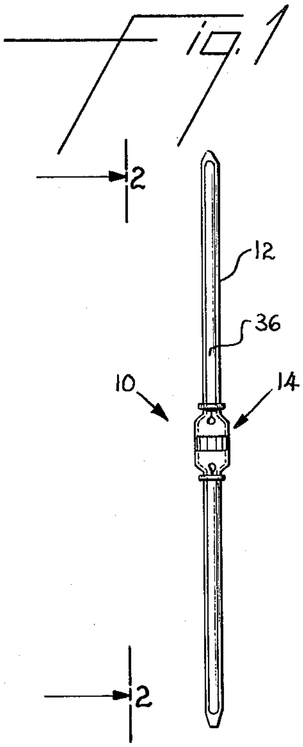
FIG. 1 is a side view of a contact post according to the invention.
Figure 2:
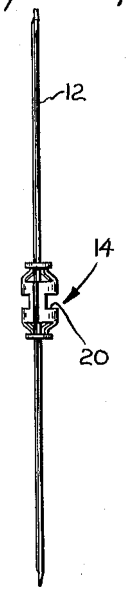
FIG. 2 is a view taken along line 2—2 of FIG. 1.
Figure 3:
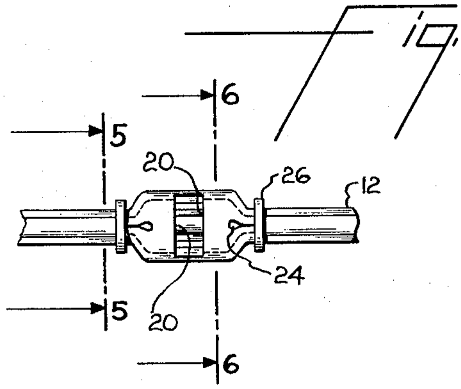
FIGS. 3 and 4 are enlarged views of the central portions of the posts illustrated in FIGS. 1 and 2.
Figure 4:
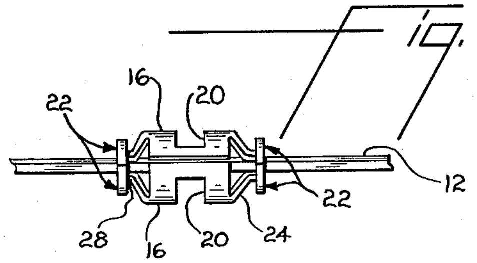
Figure 5:
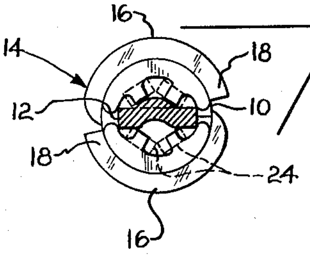
Figure 6:
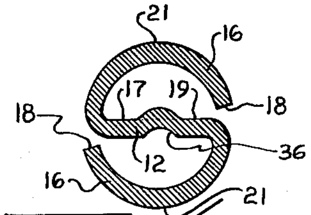
Figure 7:
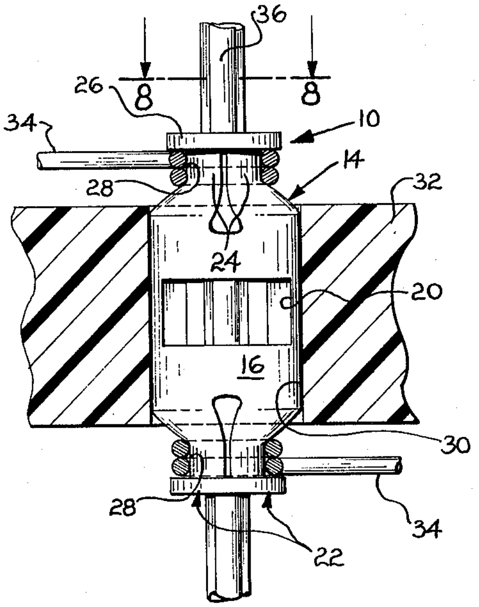
Figure 8:
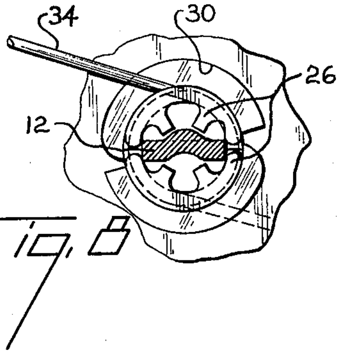

FIGS. 5 and 6 are sectional views taken along lines 5—5 and 6—6 respectively of FIG. 3;

FIG. 7 is a sectional view illustrating the central portion of a post according to the invention mounted in a support; and FIG. 8 is a view taken along line 8—8 of FIG. 7.

Contact post 10 is preferably stamp-formed from sheet metal stock and includes an elongate post 12 extending through and to both sides of the central post portion 14. Portion 14 includes a pair of arcuate springs 16 which are joined to opposite sides 17, 19 of the post at portion 14 and curve around one side of the post so that the spring free ends 18 are adjacent the other side 19, 17 of the post and the portion 14 is generally cylindrical in cross-section. Ends 18 are spaced from the adjacent connections between the springs with the other side of the post to permit resilient collapsing of the springs during positioning of the post in a support.

Cutouts 20 are provided in the springs 16 to either side of the post 12 and permit die tooling to extend through the springs and engage both sides of the post and hole the same during the forming operation of the springs. In this way the springs are accurately formed with the post extending along the axis of cylindrical portion 14.

Two wire wrap weld tabs 22 extend from each side of springs 16 and each includes a neck portion 24 and a collar portion 26. The neck portions join the collar portions adjacent the post 12 to define an annular recess 28 surrounding the post inwardly of the maximum circumference of the central post portion 14. This allows the central portion to be fitted into a hole through a support.

The contact post 10 provides an interconnect between circuit elements of certain electronic components, such as reed relay plates or the like. In use, the post may include a portion 14 and a post extending to one or both sides of the portion, depending upon the particular application. In some cases a post may not be used.

FIG. 7 illustrates a contact post of the type illustrated in FIGS. 1 through 6 mounted in a hole 30 extending through an insulating support member 32. In other applications, the support 32 may be made of metal and, where desired, a solder connection may be formed between the post 10 and the metal support, or printed circuitry on an insulated support. The diameter of hole 30 is somewhat less than the distance between the crests 21 of springs 16 so that the crests are compressed and the post is tightly held in the hole. The spacing between spring ends 18 and the other ends of the springs joining the post is such to permit the collapsing of the springs during insertion into hole 30.

After the post 10 is positioned in a support 32, two turns of thin wire 34, which may be fine insulated magnet wire, may be wrapped around the annular recesses 28 at one or both sides of the support. An electrical connection is formed between the post and the thin wire by directing a laser beam against the metal of collar portions 26 so that this metal is melted and flows onto the thin wire thus forming a fused connection with the wire. The wire 34 is very fine so that if a laser beam hit the wire directly the wire would be broken without forming the desired electrical connection with the post. The wires 34 extend from the post to other circuit components.

The springs 16 fitted in hole 30 extend essentially along the entire length of the hole and thus accurately align the elongate portions of post 12 to either side of the support with respect to the axis of the hole. These portions of the post may extend freely through small holes in other circuit elements and may be soldered to get other circuit elements located further away from the support 32. It is important that the post portions are accurately aligned relative to the axis of the hole 30 to avoid short circuit connections with circuit elements through which they extend. In addition to solder connections, other types of connections may be formed with the post portions, such as wire wrap connections or connections with disconnect terminals. In some applications, post portions 12 extend to either or both sides of the central portion. In some cases, the central portion may be used to interconnect wires 34 to either side of the support and post portions need not be provided at all.

Springs 16 closely fit the interior circumference of hole 30 to tightly hold the post in place. The post 12 is firmly and accurately positioned.

An embossed recess 36 extends along the length of post 12 to add greater strength to the post and thereby assure that the post is coaxial with the axis of the hole in the support receiving the post 10.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A contact post adapted to be mounted in a hole in a support comprising an elongate post, a pair of arcuate springs joined to opposite sides of the post and each extending substantially 180° around the post to define a generally cylindrical spring portion adapted to be fitted in the hole in the support and to engage substantially the entire interior circumference of the hole, and wire contact means extending from one side of one spring and located adjacent the post within the outer circumference of the cylindrical spring portion.

2. A contact post adapted to be mounted in a hole in a support comprising an elongate post, a pair of arcuate springs joined to opposite sides of the post and each extending substantially 180° around the post to define a generally cylindrical spring portion adapted to be fitted in the hole in the support and to engage substantially the entire interior circumference of the hole, and wire wrap weld tabs extending from the same side of both springs, said tabs including neck portions extending from the springs toward the post and collar portions extending from the ends of the neck portions outwardly of the post to define an annular wire wrap recess surrounding the post.

3. A contact post as in claim 1 including openings extending through the crests of said springs.

4. A contact post as in claim 2 wherein said post includes a strengthening recess extending along the length thereof.

5. A contact post as in claim 1 wherein said post extends to both sides of said spring portion.

6. A contact post as in claim 1 wherein said post extends to one side of said spring portion.

7. A contact post adapted to be mounted in a hole in a support comprising an elongate metal post, a pair of arcuate springs joined to opposite sides of the post and each extending substantially 180° around the post with the free end of each spring located closely adjacent the connection between the other spring and the post, said springs defining a generally cylindrical spring portion adapted to be fitted in the hole in the support and to engage substantially the entire interior circumference of the hole, weld tabs extending from both sides of said springs and each including a neck portion and a collar portion, the junction between said neck and collar portions being located adjacent said post so as to define an annular wire wrap recess surrounding the post to each side of the springs, said tabs being located within the outer circumference of the spring portion.

8. A contact post as in claim 7 wherein two weld tabs extend to each side of each spring.

9. A contact post as in claim 8 including openings extending through the crests of said springs.

10. A contact post as in claim 9 including a strengthening recess extending along the length of the post and through the spring portion.

11. A contact member adapted to be mounted in a hole in a support comprising a central portion, a pair of arcuate springs joined to opposite sides of said central portion and each extending substantially 180° around the central portion to define a generally cylindrical spring system substantially surrounding the central portion, such system being adapted to be fitted in the hole in the support and to engage the sides of the hole, diametrally opposed openings extending through the crests of said springs to either side of said central portion and a contact post extending from one end of the central portion.

12. A contact member as in claim 11 including a contact post extending from each end of said central portion.

* * * * *